US009442960B2

(12) United States Patent
Pascucci

(10) Patent No.: US 9,442,960 B2
(45) Date of Patent: Sep. 13, 2016

(54) HIGH PERFORMANCE DATA LAYOUT AND PROCESSING

(75) Inventor: Valerio Pascucci, Salt Lake City, UT (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 1875 days.

(21) Appl. No.: 12/466,488

(22) Filed: May 15, 2009

(65) Prior Publication Data

US 2009/0287702 A1 Nov. 19, 2009

Related U.S. Application Data

(60) Provisional application No. 61/053,763, filed on May 16, 2008.

(51) Int. Cl.
*G06F 17/30* (2006.01)

(52) U.S. Cl.
CPC .................. *G06F 17/3028* (2013.01)

(58) Field of Classification Search
None
See application file for complete search history.

(56) References Cited

U.S. PATENT DOCUMENTS

| 7,428,737 B1 * | 9/2008 | Borghesani et al. ......... 719/332 |
| 2005/0018223 A1 | 1/2005 | Debevec et al. |
| 2005/0237341 A1 | 10/2005 | Gangnet et al. |
| 2006/0078206 A1 | 4/2006 | Mishima et al. |
| 2006/0271871 A1 * | 11/2006 | Blaukopf et al. ............. 715/764 |
| 2007/0271224 A1 | 11/2007 | Essafi et al. |
| 2008/0095028 A1 * | 4/2008 | Seo et al. ................... 369/275.3 |
| 2008/0144079 A1 * | 6/2008 | Pandey et al. ............... 358/1.15 |
| 2009/0043978 A1 * | 2/2009 | Sawdon et al. ............... 711/162 |

OTHER PUBLICATIONS

Article entitled "Global Static Indexing for Real-Time Exploration of Very Large Rectangular Grids", dated Nov. 2001, by Pascucci et al.*
Article entitled "Hierarchical Indexing for Out-Of-Core Access to Multi-Resolution Data", dated 2002, by Pascucci et al.*
Agarwala, A., "Efficient Gradient-Domain Compositing Using Quadtrees," *ACM Transactions on Graphics*, vol. 26, No. 3, Article 94, Jul. 2007, pp. 1-5.
Balmelli, L. et al., "Quadtrees for Embedded Surface Visualization: Constraints and Efficient Data Structures," *Proc. of IEEE International Conference on Image Processing*, vol. 2, Oct. 1999, pp. 487-491.
Berger, M. et al., "Local Adaptive Mesh Refinement for Shock Hydrodynamics," *Journal of Computational Physics*, vol. 82, 1989, pp. 64-84.

(Continued)

*Primary Examiner* — Mahesh Dwivedi
(74) *Attorney, Agent, or Firm* — Bell & Manning, LLC

(57) ABSTRACT

A method, a system, and a computer-readable medium are provided which provide an efficient data layout for image data and fast access to samples of an image stored in hierarchical z-order format. An array of image data of a physical entity is ordered in a hierarchical z-order at a computing device. Data blocks are created from the array ordered based on the hierarchical z-order. Data files containing a predetermined number of successive data blocks are created from the created data blocks. A directory structure is created in a file system of a second computing device based on the hierarchical z-order. The created data files are stored in the created directory structure based on the hierarchical z-order.

19 Claims, 24 Drawing Sheets

| Z-order | Binary representation i | j |
|---|---|---|
| 0 | 0000 | 00 | 00 |
| 1 | 0001 | 01 | 00 |
| 2 | 0010 | 00 | 01 |
| 3 | 0011 | 01 | 01 |
| 4 | 0100 | 10 | 00 |
| 5 | 0101 | 11 | 00 |
| 6 | 0110 | 10 | 01 |
| 7 | 0111 | 11 | 01 |
| 8 | 1000 | 00 | 10 |
| 9 | 1001 | 01 | 10 |
| 10 | 1010 | 00 | 11 |
| 11 | 1011 | 01 | 11 |
| 12 | 1100 | 10 | 10 |
| 13 | 1101 | 11 | 10 |
| 14 | 1110 | 10 | 11 |
| 15 | 1111 | 11 | 11 |

(56) References Cited

OTHER PUBLICATIONS

Bolitho, M. et al., "Multilevel Streaming for Out-of-Core Surface Reconstruction," *Proceedings of the fifth Eurographics symposium on Geometry processing*, 2007, pp. 69-78.

Kazhdan, M. et al., "Reconstruction of Solid Models from Oriented Point Sets," *Eurographics Symposium on Geometry Processing*, Jul. 2005, pp. 73-82.

Kazhdan, M. et al., "Poisson Surface Reconstruction," *Eurographics Symposium on Geometry Processing*, Jun. 2006, pp. 61-70.

Kazhdan, M. et al., "Streaming Multigrid for Gradient-Domain Operations on Large Images," *ACM Transactions on Graphics*, vol. 27, No. 3, Article 21, Aug. 2008, pp. 1-10.

Pascucci, V. et al., "Global Static Indexing for Real-time Exploration of Very Large Regular Grids," *Supercomputing*, vol. 2, 2001.

Pascucci, V. et al., "Hierarchical Indexing for Out-of-Core Access to Multi-Resolution Data," *Hierarchical and Geometrical Methods in Scientific Visualization*, 2002, pp. 225-241.

Pascucci, V. et al., "Real-time Monitoring of Large Scientific Simulations," *ACM*, 2003, pp. 194-198.

Pérez, P. et al., "Poisson Image Editing," *ACM Transactions on Graphics*, vol. 22, No. 3, 2003, pp. 313-318.

Ricker, P. M., "A Direct Multigrid Poisson Solver for Oct-Tree Adaptive Meshes," *The Astrophysical Journal Supplement Series*, vol. 176, May 2008, pp. 293-300.

International Search Report and Written Opinion received in PCT/US2011/058543, Apr. 23, 2012.

\* cited by examiner

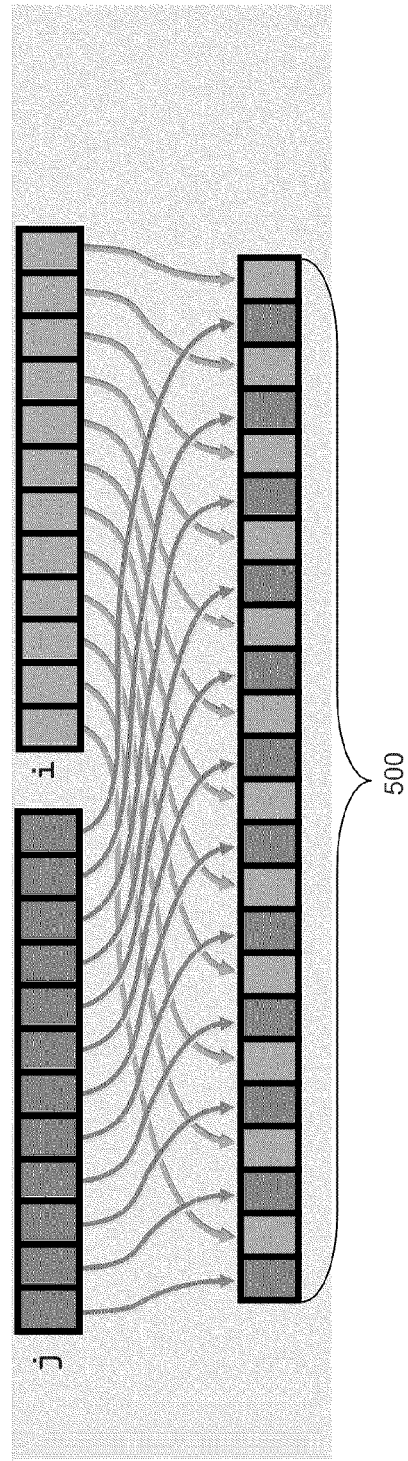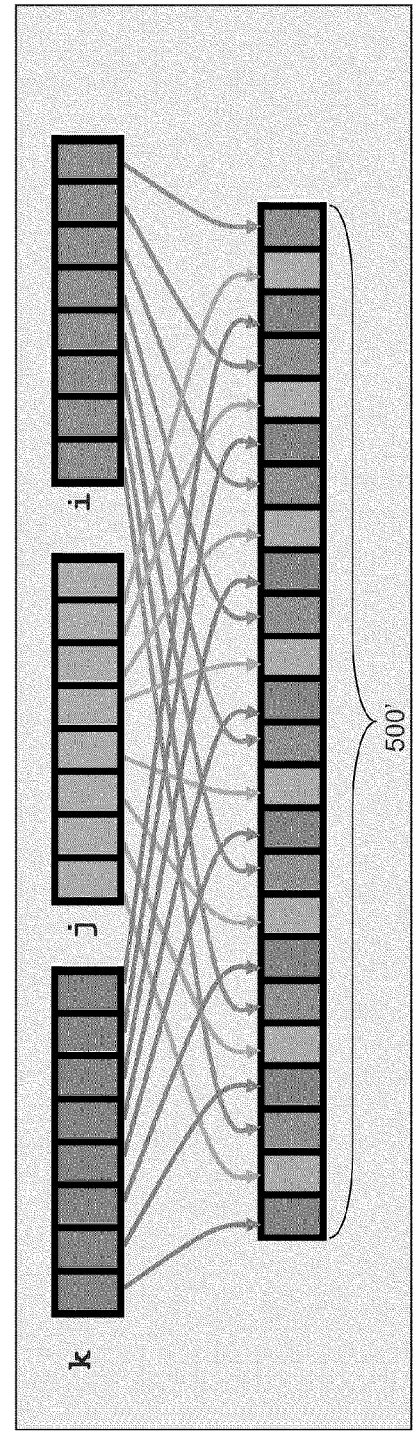
Fig. 5a
Fig. 5b

| Sample index | Binary representation | | |
|---|---|---|---|
| | Z-order | i | j |
| 0 | 0000 | 00 | 00 |
| 1 | 0001 | 01 | 00 |
| 2 | 0010 | 00 | 01 |
| 3 | 0011 | 01 | 01 |
| 4 | 0100 | 10 | 00 |
| 5 | 0101 | 11 | 00 |
| 6 | 0110 | 10 | 01 |
| 7 | 0111 | 11 | 01 |
| 8 | 1000 | 00 | 10 |
| 9 | 1001 | 01 | 10 |
| 10 | 1010 | 00 | 11 |
| 11 | 1011 | 01 | 11 |
| 12 | 1100 | 10 | 10 |
| 13 | 1101 | 11 | 10 |
| 14 | 1110 | 10 | 11 |
| 15 | 1111 | 11 | 11 |

Fig. 6

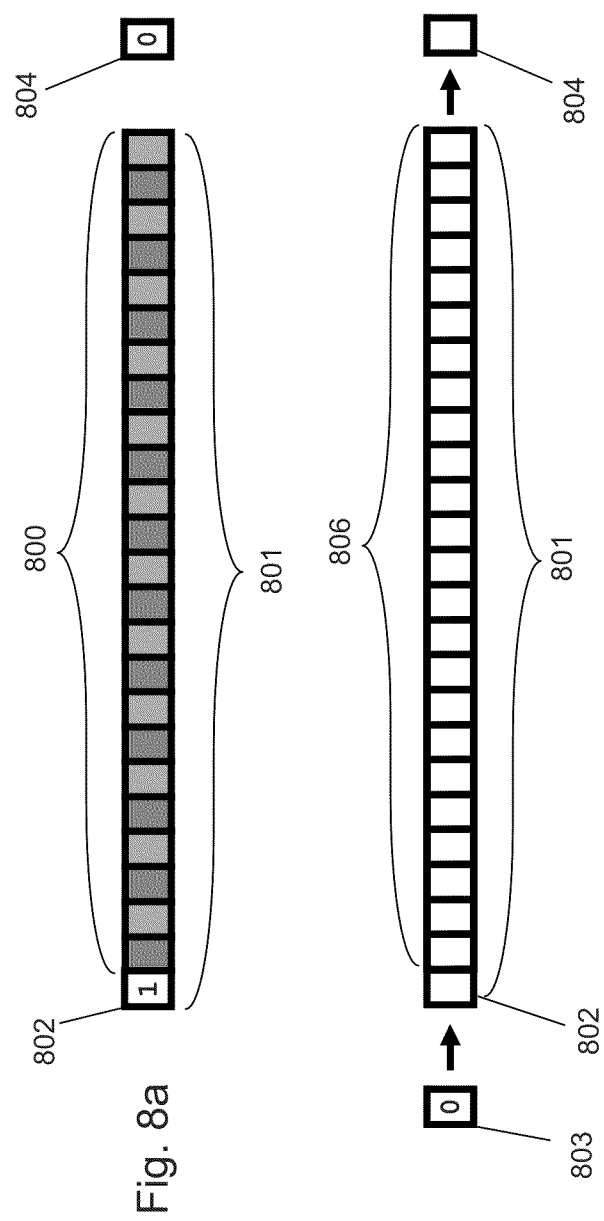

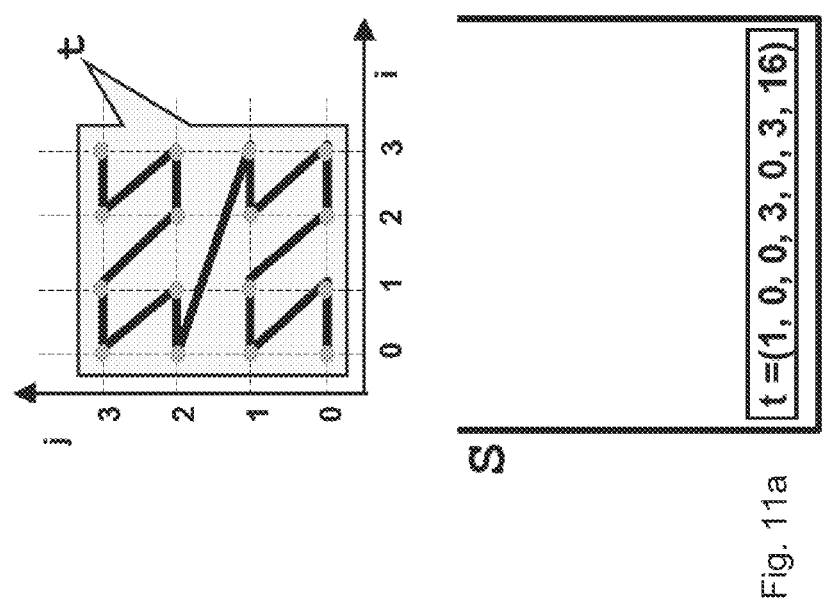

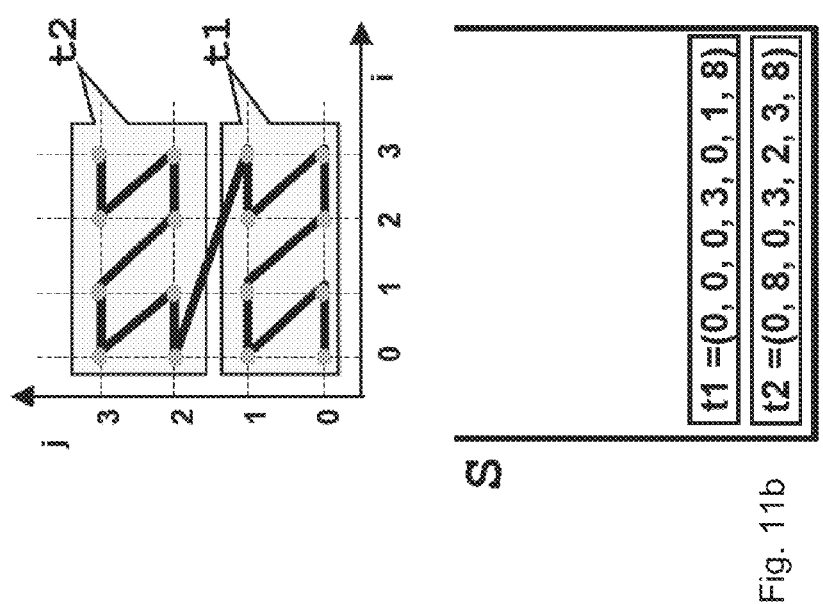

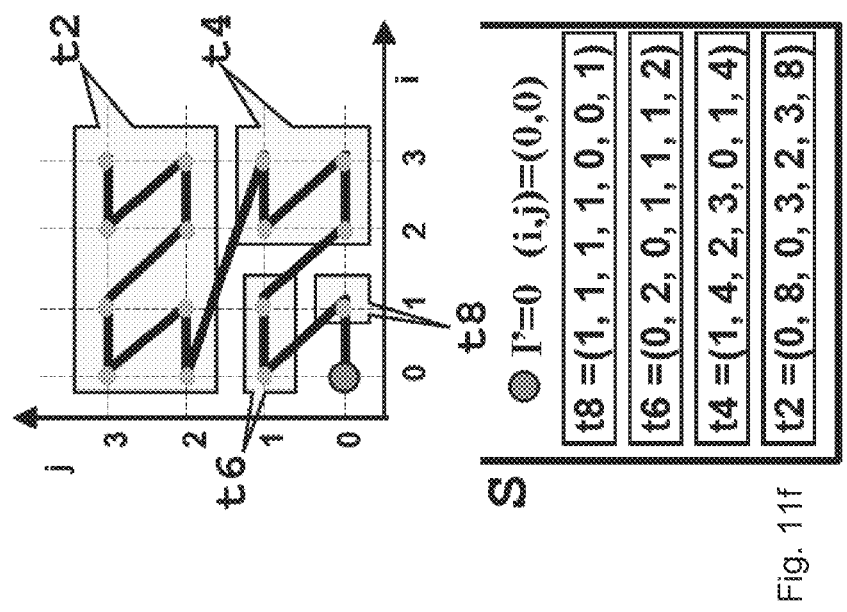

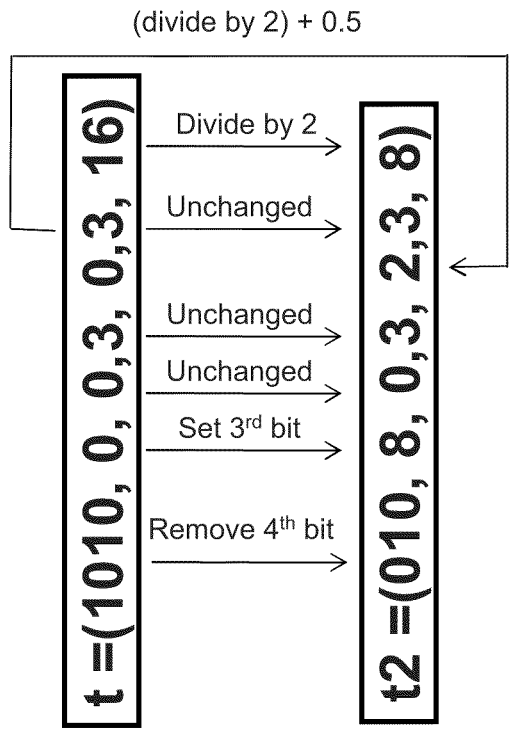
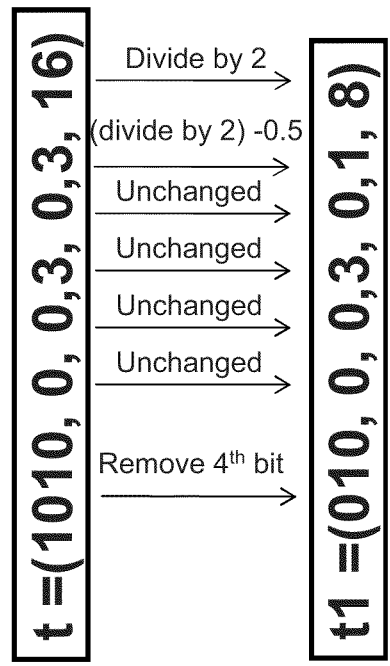
Fig. 12

HIGH PERFORMANCE DATA LAYOUT AND PROCESSING

CROSS-REFERENCE TO RELATED PATENT APPLICATIONS

The present application claims priority to U.S. Provisional Application No. 61/053,763, filed May 16, 2008, the entire disclosure of which is incorporated herein by reference.

BACKGROUND

Gigapixel and larger images are becoming increasingly popular due to the availability of high-resolution cameras and inexpensive robots for the automatic capture of large image collections. These tools simplify the acquisition of large stitched panoramas that are becoming easily accessible over the internet. Even more massive images from aerial satellite photography are freely distributed, e.g. from the USGS website. At the same time, computed tomography (CT) and microscopy scans allow acquisition of massive three-dimensional (3D) images for mechanical engineering applications or reconstruction of biological structures. The full potential of such imagery may only be realized by scientists or artists by enhancing, manipulating, and/or compositing the original images. However, using the combined panoramas typically requires offline processing to reduce varying lighting and coloring artifacts or to perform other editing or analysis on the data sets because the real time processing of very large volumetric meshes introduces specific algorithmic challenges due to the impossibility of fitting the input data in the main memory of a computer. The basic assumption of uniform-constant-time access to each memory location is not valid because part of the data is stored out-of-core or in external memory. The performance of most algorithms does not scale well in the transition from the in-core to the out-of-core processing conditions. The performance degradation is due to the high frequency of input/output operations that may start dominating the overall running time. Thus, because of the large data set sizes, enhancing, manipulating, and/or compositing the images or otherwise analyzing the data is computationally expensive.

SUMMARY

In an example embodiment, a method for providing an efficient data layout for image data is provided. An array of image data of a physical entity is ordered in a hierarchical z-order at a computing device. Data blocks are created from the array ordered based on the hierarchical z-order. Data files containing a predetermined number of successive data blocks are created from the created data blocks. A directory structure is created in a file system of a second computing device based on the hierarchical z-order. The created data files are stored in the created directory structure based on the hierarchical z-order.

In another example embodiment, a computer-readable medium is provided having stored thereon computer-readable instructions that, if executed by a computing device, cause the computing device to perform the method of providing an efficient data layout for image data.

In yet another example embodiment, a system is provided. The system includes, but is not limited to, a processor and the computer-readable medium operably coupled to the processor. The computer-readable medium has instructions stored thereon that, if executed by the processor, cause the system to perform the method of providing an efficient data layout for image data.

Other principal features and advantages of the invention will become apparent to those skilled in the art upon review of the following drawings, the detailed description, and the appended claims.

BRIEF DESCRIPTION OF THE DRAWINGS

Example embodiments of the invention will hereafter be described with reference to the accompanying drawings, wherein like numerals denote like elements.

FIG. 5a depicts a graph of an address transformation from a two-dimensional (2D) row-major index (i, j) to z-order index I.

FIG. 5b depicts a graph of an address transformation from a 3D row-major index (i, j, k) to z-order index I.

FIG. 6 depicts a table mapping from row-major index (i, j) to the z-order index I.

FIGS. 8a and 8b depict a graph of an address transformation from z-order index I to the hierarchical z-order index P.

FIGS. 11a-11j depict a process for z-order traversal of the two-dimensional array of FIG. 4 with concurrent index computation in accordance with an example embodiment.

FIG. 12 depicts a process for obtaining a transformation of a parameter list by manipulating bits in accordance with an example embodiment.

DETAILED DESCRIPTION

Figure 1:
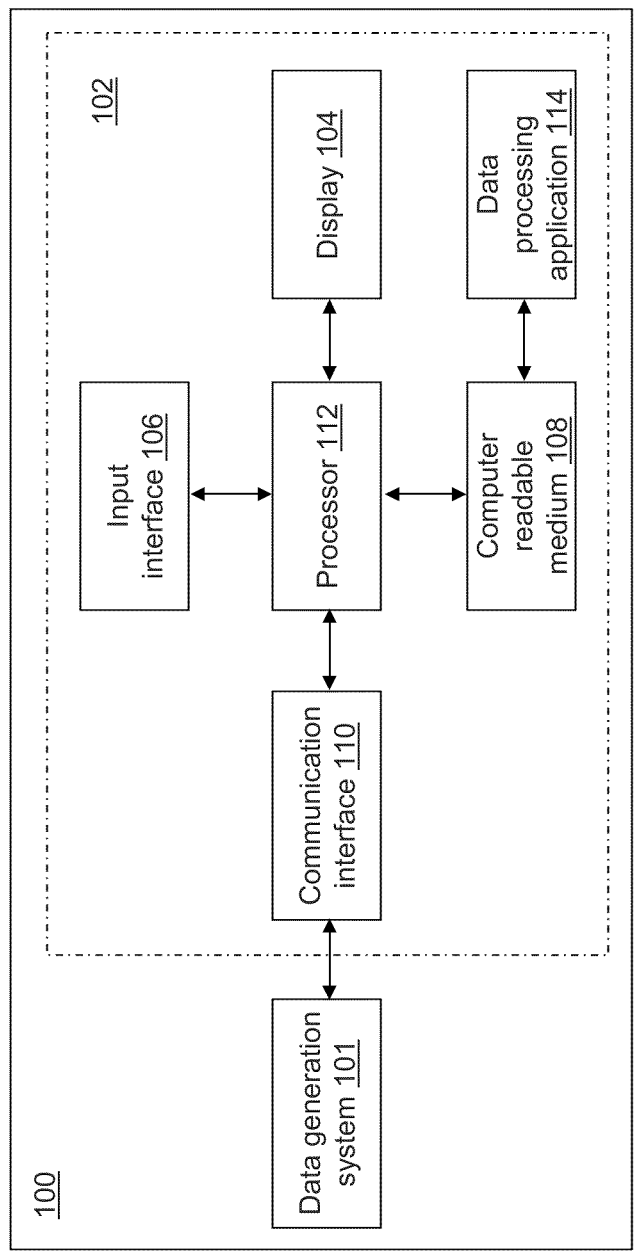
FIG. 1 depicts a block diagram of a data processing system in accordance with an example embodiment.

With reference to FIG. 1, a block diagram of a data processing system 100 is shown in accordance with an example embodiment. Data processing system 100 may include a data generation system 101 and a computing device 102. Computing device 102 may include a display 104, an input interface 106, a computer-readable medium 108, a communication interface 110, a processor 112, and a data processing application 114. In the embodiment illustrated in FIG. 1, data generation system 101 generates data related to a physical entity in two-dimensions, three-dimensions, four-dimensions, etc. In an example embodiment, the data is obtained from a sensor such as a radar, an infrared sensor, an optical sensor, etc. For example, the sensor may be a panoramic camera that obtains two-dimensional data from a vantage point on the earth's surface such as of a city. Alternatively, the sensor may be a satellite based synthetic aperture radar that obtains three-dimensional terrain data of the earth's surface. As another alternative, the sensor may be an infrared sensor that obtains thermal data of the earth's surface. As yet another alternative, the sensor may be part of a medical imaging system such as a magnetic resonance imaging device, a computed tomography scanner, etc. The source of and the dimensionality of the data is not intended to be limiting.

Computing device 102 may be a computer of any form factor. Different and additional components may be incorporated into computing device 102. Display 104 presents information to a user of computing device 102 as known to those skilled in the art. For example, display 104 may be a thin film transistor display, a light emitting diode display, a liquid crystal display, or any of a variety of different displays known to those skilled in the art now or in the future.

Input interface 106 provides an interface for receiving information from the user for entry into computing device 102 as known to those skilled in the art. Input interface 106 may use various input technologies including, but not limited to, a keyboard, a pen and touch screen, a mouse, a track ball, a touch screen, a keypad, one or more buttons, etc. to allow the user to enter information into computing device 102 or to make selections presented in a user interface displayed on display 104. Input interface 106 may provide both an input and an output interface. For example, a touch screen both allows user input and presents output to the user. Computing device 102 may have one or more input interfaces that use the same or a different input interface technology.

Computer-readable medium 108 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing device 102 may have one or more computer-readable media that use the same or a different memory media technology. Computing device 102 also may have one or more drives that support the loading of a memory media such as a CD or DVD. Computer-readable medium 108 may comprise a cache in which data can be stored temporarily for rapid access by processor 112. Computer-readable medium 108 further may comprise a file system in which data files are stored and organized for access by processor 112.

Communication interface 110 provides an interface for receiving and transmitting data between devices using various protocols, transmission technologies, and media as known to those skilled in the art. The communication interface may support communication using various transmission media that may be wired or wireless. Computing device 102 may have one or more communication interfaces that use the same or a different communication interface technology. Data may be transferred between computing device 102 and data generation system 101 using communication interface 110. Additionally, communication interface 110 may provide connectivity to other systems. For example, communication interface 110 may provide connectivity to a remote file system or database.

Processor 112 executes instructions as known to those skilled in the art. The instructions may be carried out by a special purpose computer, logic circuits, or hardware circuits. Thus, processor 112 may be implemented in hardware, firmware, software, or any combination of these methods. The term "execution" is the process of running an application or the carrying out of the operation called for by an instruction. The instructions may be written using one or more programming language, scripting language, assembly language, etc. Processor 112 executes an instruction, meaning that it performs the operations called for by that instruction. Processor 112 operably couples with display 104, with input interface 106, with memory 108, and with communication interface 110 to receive, to send, and to process information. Processor 112 may retrieve a set of instructions from a permanent memory device and copy the instructions in an executable form to a temporary memory device that is generally some form of RAM. Computing device 102 may include a plurality of processors that use the same or a different processing technology.

Data processing application 114 performs operations associated with processing data generated by data generation system 101 such as constructing an image from imaging data such as optical data obtained from a camera. Some or all of the operations described may be embodied in data processing application 114. The operations may be implemented using hardware, firmware, software, or any combination of these methods. With reference to the example embodiment of FIG. 1, data processing application 114 is implemented in software stored in computer-readable medium 108 and accessible by processor 112 for execution of the instructions that embody the operations of image data processing application 114. Data processing application 114 may be written using one or more programming languages, assembly languages, scripting languages, etc. As known to those skilled in the art, data processing application 114 may be implemented as a plug-in to a second data processing application.

Components of data processing system 100 may be positioned in a single location, a single facility, and/or may be remote from one another. Data generation system 101 and computing device 102 may be integrated into a single system. Data generation system 101 and computing device 102 may be connected directly. For example, data generation system 101 may connect to computing device 102 using a cable for transmitting information between data generation system 101 and computing device 102. Data generation system 101 may connect to computing device 102 using a network. Data may be stored electronically and accessed using computing device 102. Data generation system 101 and computing device 102 may not be connected. Instead, the data acquired using data generation system 101 may be manually provided to computing device 102. For example, the data may be stored on electronic media such as a CD, a DVD, a flash drive, etc. After receiving the data, computing device 102 may initiate processing of the data automatically or under control of an operator of computing device 102.

Figure 2:
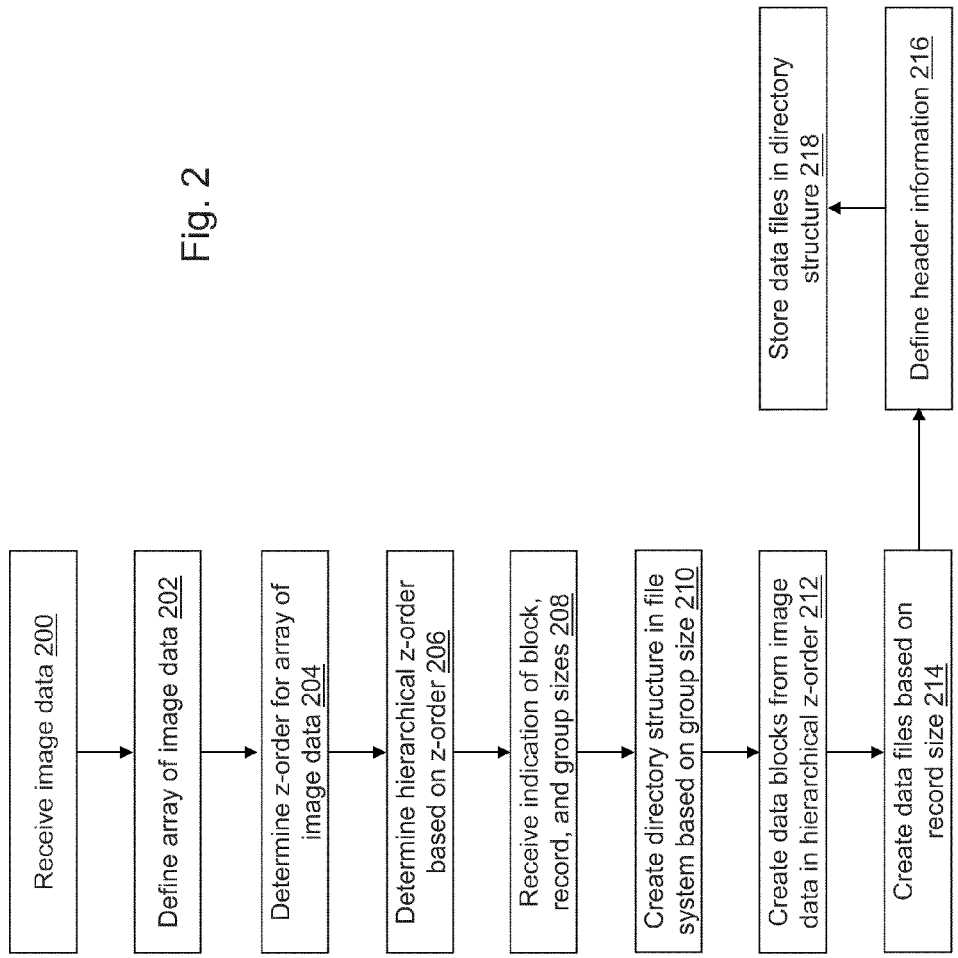
FIG. 2 depicts a first flow diagram illustrating first example operations performed by the data processing system of FIG. 1 in accordance with an example embodiment.

With reference to FIG. 2, example operations associated with data processing application 114 of FIG. 1 are described.

Additional, fewer, or different operations may be performed, depending on the embodiment. The order of presentation of the operations of FIG. 2 is not intended to be limiting. In an operation 200, image data is received. For example, the image data may be stored at computing device 102 and selected for input to data processing application 114 which receives the image data as an input. As another alternative, the image data may be streamed to computing device 102 from data generation system 101.

In an operation 202, an array of data is defined from the data. In an example embodiment, the array is defined in row-major order though this is not required and other traversal orders may be used in defining the array of data.

Figure 4:
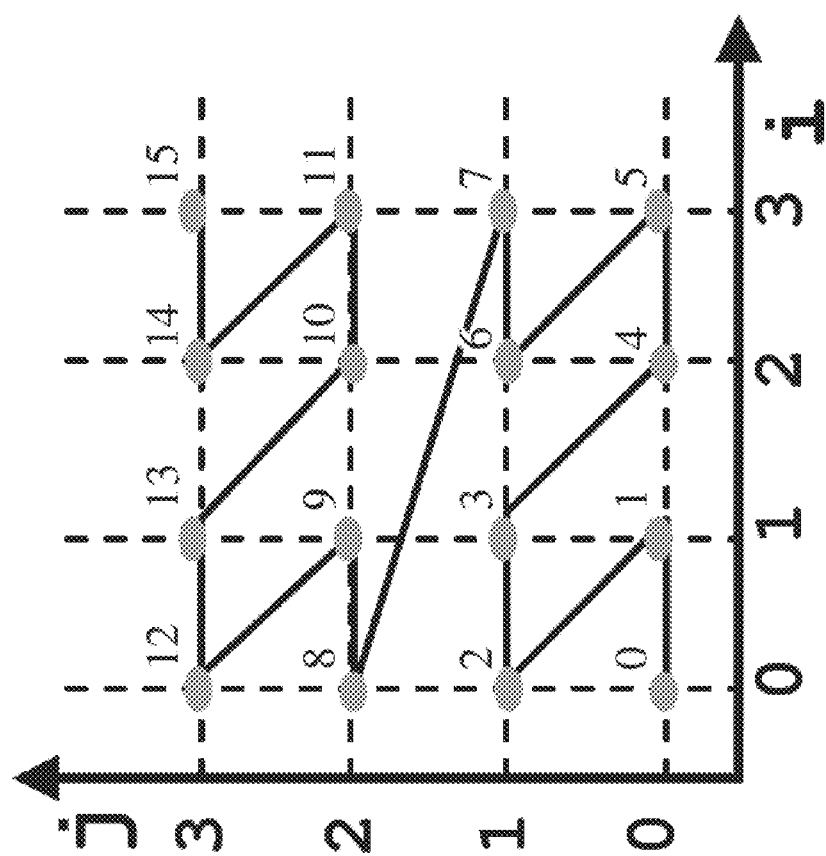
FIG. 4 depicts a graph of a z-order space filling curve overlaid on a two-dimensional array of data in row-major order.

In an operation 204, z-ordered data is defined from the array of data. With reference to FIG. 4, an example of z-ordered data (0, 1, 2, 3, . . . , 15) is shown for a 4×4 array of data arranged in row-major order (i, j). In the two-dimensional case, the z-order curve can be defined recursively by a "z" shape whose vertices are replaced by "z" shapes half its size. Given the binary row-major index of a pixel $(i_0 i_1 \ldots i_n; j_0 j_1 \ldots j_n)$, the corresponding z-order index I is computed by interleaving the indices $I=j_0 i_0 j_1 i_1 \ldots j_n i_n$ as shown in FIG. 5a resulting in the table as shown in FIG. 6. FIG. 5b shows the same process for a 3D array stored in row-major order (i, j, k).

Figure 7:
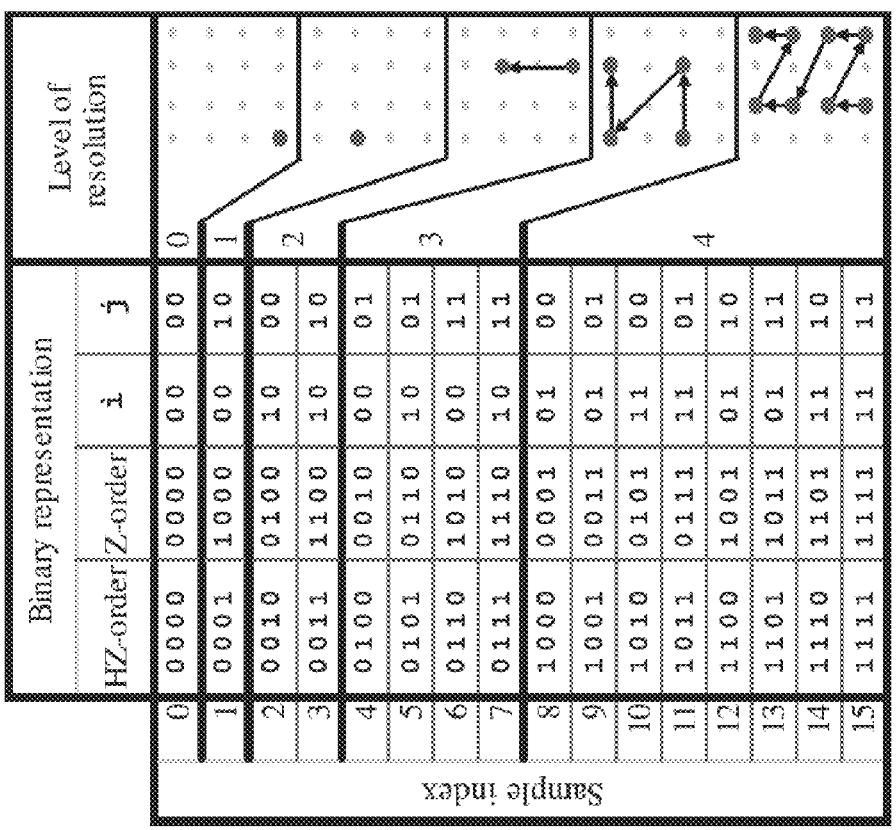
FIG. 7 depicts a table mapping from row-major index (i, j) to the z-order index I to the hierarchical z-order index P.

With continuing reference to FIG. 2, in an operation 206, a hierarchical z-order (HZ-order) is determined as shown in FIG. 7 based on the z-order index. As shown in FIG. 8a, to start the process, a first bit 802 is set to one and is added to the left of the given z-order index I 800 forming a second z-order index I 801, and an exit bit 804 is set to zero. With reference to FIG. 8b, the hierarchical z-order is computed by shifting second z-order index I 801 to the right until the first one-bit exits in exit bit 804. As shown in FIG. 8b, the z-order index I 801 is shifted to the right and first bit 802 is set to zero in all subsequent shifts until exit bit 804 is one. The resulting index $I^h$ 806 comprised of the right most bits is the hierarchical z-order.

As an example conversion from the z-order index to the hierarchical z-order index, assume the given z-order index is 0010110100. The conversion results in the hierarchical z-order index of 0010010110 based on the following steps:

| Initial bit | Index bits | Exit bit |
|---|---|---|
| 1 | 0010110100 | |
| 0 | 1001011010 | 0 |
| 0 | 0100101101 | 0 |
| 0 | 0010010110 | 1 |

As indicated in the far right column of FIG. 7, the hierarchical z-order provides an index that supports hierarchical access to the data. The starting hierarchical z-order index for each resolution level can be directly computed. For example, in a squared array, level 0 contains one sample and all other levels h contain $2^{h-1}$ samples. Therefore, the starting hierarchical z-order index of level h, $I_{start}^h$, is $2^{m-h}$ where m is the number of bits of the largest hierarchical z-order index. Within each level, samples are ordered according to plain z-order and can be traversed using a stack algorithm described below using the appropriate sub-sampling rate. Thus, iteration of the array in hierarchical z-order can be accomplished by processing one resolution level at a time until the appropriate level of resolution is obtained based on the current processing on the data.

Figure 9A:
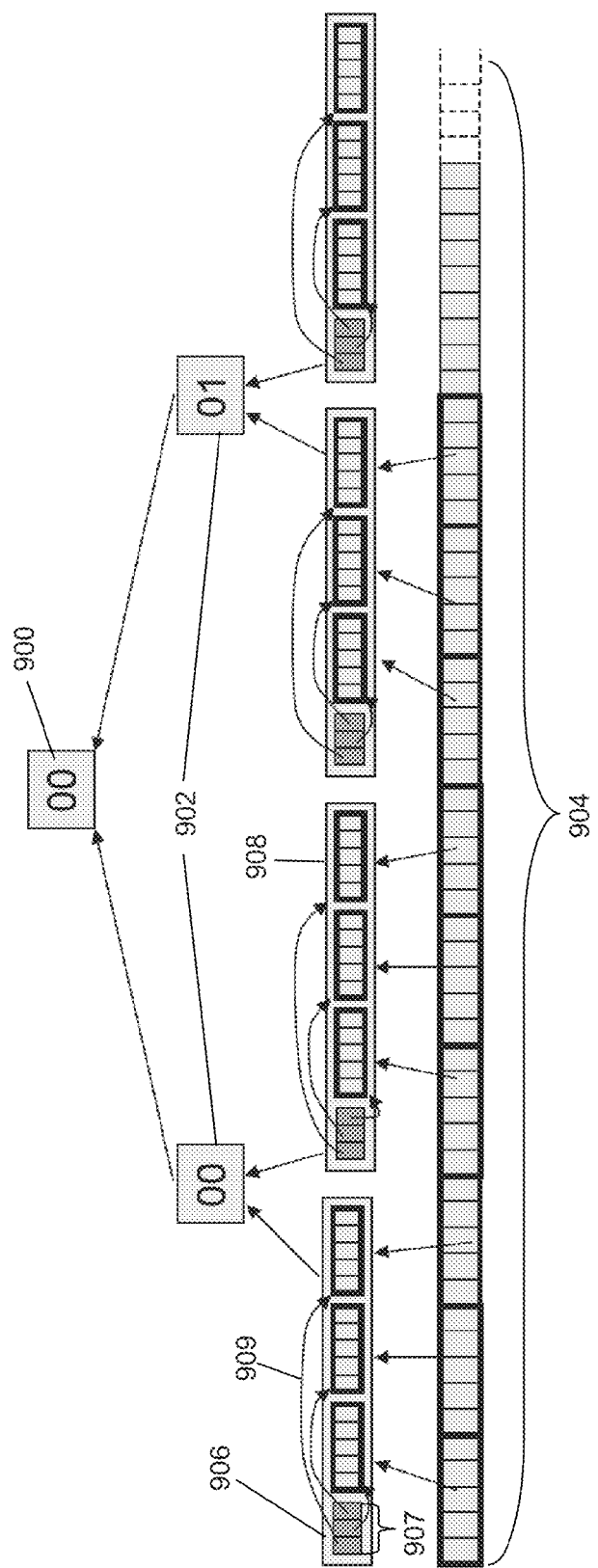
FIG. 9a depicts a file storage format for images of fixed resolution and for data sorted in hierarchical z-order in accordance with an example embodiment.
Figure 9B:
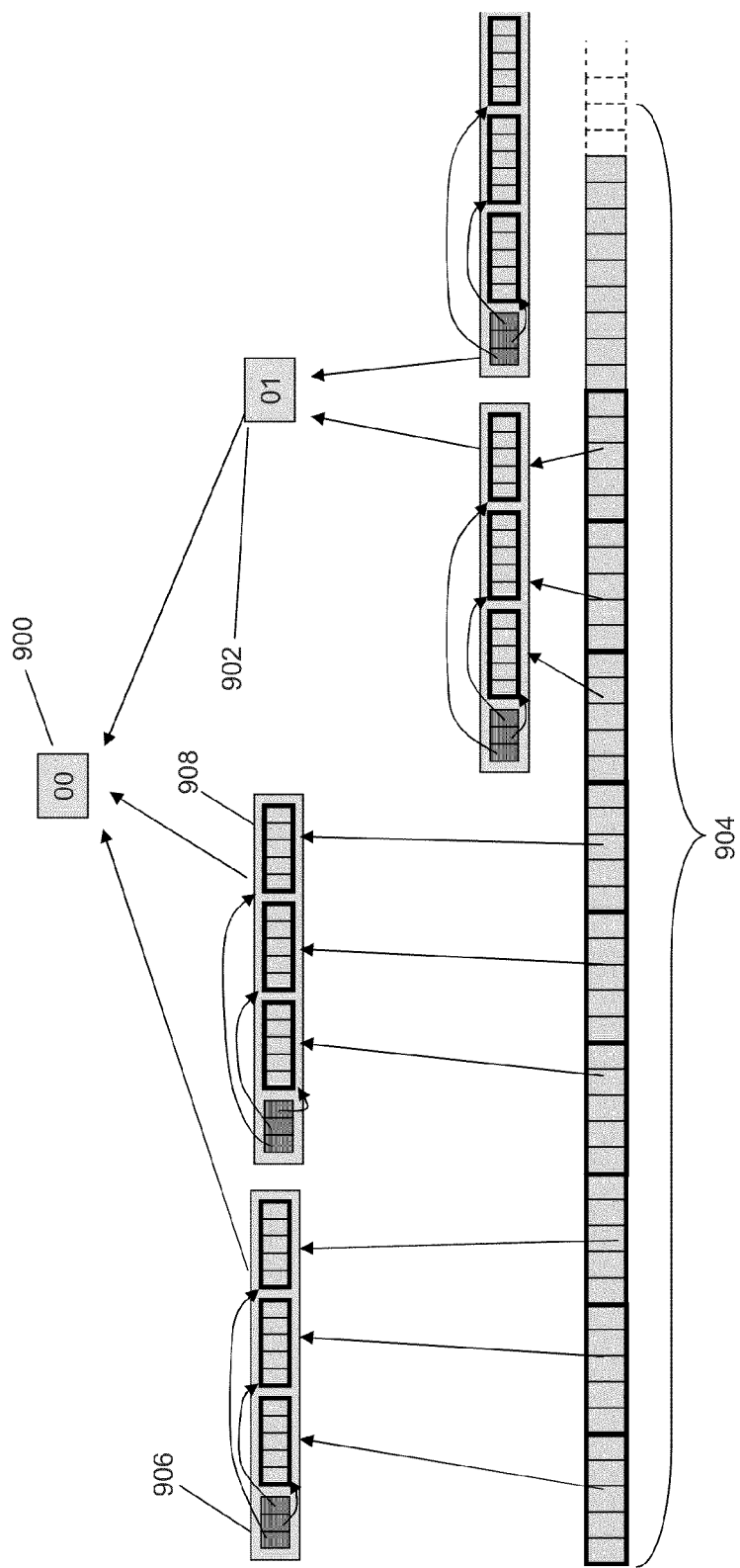
FIG. 9b depicts a file storage format for images of variable adaptive resolution and for data sorted in hierarchical z-order in accordance with an example embodiment.
Figure 9C:
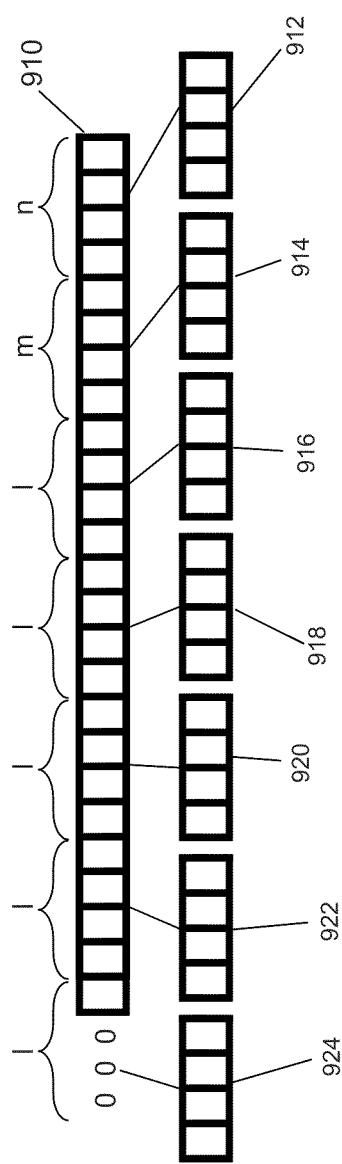
FIG. 9c depicts a sample of address computation for the file storage format in accordance with an example embodiment.

To provide efficient access to any sub-region of the data without internal caching and without opening a data block more than once, the data can be stored based on blocks of data organized in the hierarchical z-order. With continuing reference to FIG. 2, in an operation 208, an indication of a block size, a record size, and a group size is received. For example, the block size, the record size, and the group size may be set to default values in computer readable medium 108, received as an input from a user of data processing application 114, calculated based on an array size, etc. In an operation 210, a directory structure is created. For example, with reference to FIG. 9a, two levels of directories are created to store the data files, a first directory level 900 and a second directory level 902 which are formed as subdirectories of first directory level 900. FIG. 9a illustrates a storage model for images of predetermined maximum resolution. With reference to FIG. 9b, a storage model for images of a variable adaptive maximum resolution is shown with the same data stored in a more flexible structure where prefix subdirectories composed of all zeroes are eliminated from the address computation shown in FIG. 9c so that all their content is moved to higher levels in the directory structure With continuing reference to FIG. 2, in an operation 212, data blocks of the indicated block size are created from the received image data in hierarchical z-order. For example, with reference to FIG. 9, data blocks 904 having a block size of five are created from consecutive samples of the data reordered in hierarchical z-order.

With continuing reference to FIG. 2, in an operation 214, data files are created from a sequence of data blocks based on the indicated record size. For example, with reference to FIG. 9a, a first data file 906 with a record size of three includes three successive data blocks, a second data file 908 includes the next three successive data blocks and based on a defined group size of two, the data files are clustered in groups of two in a subdirectory. Thus, a sequence of consecutive blocks is grouped into a record and records are clustered in groups, which are organized hierarchically within the created directory structure. Consider, for example, the case of FIG. 9c where each directory contains $2^l$ files or subdirectories, each file contains $2^m$ blocks, each block contains $2^n$ samples. Using the storage structure illustrated in FIG. 9a, an index $I^h$ 910 defines a position for a data sample in a block given by the last n bits 912 of index $I^h$ 910, within a file at a block index given by the next m bits 914 of index $I_h$ 910, within the file given by the next l bits 916 of index $I_h$ 910 within a hierarchy of subdirectories for which each index is given by the next l bits 918, 920, 922, 924 of index $I^h$ 910. Consequently, the total number of directories, files, and blocks depend on the values of the parameters l, m, and n. Using the storage structure illustrated in FIG. 9b, the position of the same sample index $I^h$ 910 is computed in the same way after removing all of the leading zeroes 924 on the left of index $I^h$ 910. This makes the storage position of the coarse samples independent of the total number of bits in $I^h$ and allows adding new samples of arbitrarily finer resolution.

In an operation 216, header information is defined that describes the various parameters such as the dimension of the received image data, the block size, the record size, the group size, etc. For example, with continuing reference to FIG. 9a, a header 907 includes header information. Each record may have header 907 that specifies which of its blocks are actually present, and if the data is stored in a raw format or a compressed format, and if the data is stored in a compressed format, an indicator of the compression format. In a first example implementation, a single file having a header describing the parameters of the format, i.e., interleaving sequence, block size, record size, etc., followed by the binary representation of the blocks. In a second example implementation, the header information may be stored in a special header file and each record in a separate file without a header.

With continuing reference to FIG. 9a, a pointer 909 in header 907 points to the position of the block within a record. This accommodates blocks of variable size (e.g. for compression), blocks out of order (e.g. following creation order), and avoids wasting space when blocks are missing. Optionally, a bit per sample can be used to specify if each sample is part of the input image or not which accommodates images of arbitrary size and samples that can be part of only part of a block. The sizes of blocks, records, and groups can be adjusted to better optimize the performance of the memory structure where the image is stored. For example, on a file system each directory can store efficiently a group of 256 files and/or subdirectories, a file can contain 128 blocks, and each block can contain 4096 data samples. In general, it is better if the sizes are powers of two because this simplifies some of the index computations.

In an operation 218, the created data files are stored in the created directory structure. Incomplete arrays and arrays of arbitrary size can be stored. The use of a file system to store and access the hierarchy using directories is not intended to be limiting and can be implemented with search trees or hash tables or other hierarchical reference mechanisms and stored in single databases or across multiple files or accessing each record or group in different storage locations distributed over the Internet or other heterogeneous storage infrastructures.

Thus, the hierarchy of groups is implemented as a hierarchy of directories each containing a predetermined maximum number of subdirectories and possibly records. The leaves of each directory contain only records. To open a file, the path to the file is reconstructed, and the file system is used to locate the file directly. In particular, the path to a record can be constructed by taking the hierarchical z-order address of the first sample in the record, representing the address as a string, and partitioning the string into groups of characters naming directories, subdirectories, and the record file. Because blocks, records, and/or groups can be missing, the arrays of data need not cover the entire index space. In fact, received image data can easily be stored with different regions sampled at different resolutions. With the storage structure shown in FIG. 9b, the resolution can even be increased after the initial image creation.

Figure 10:
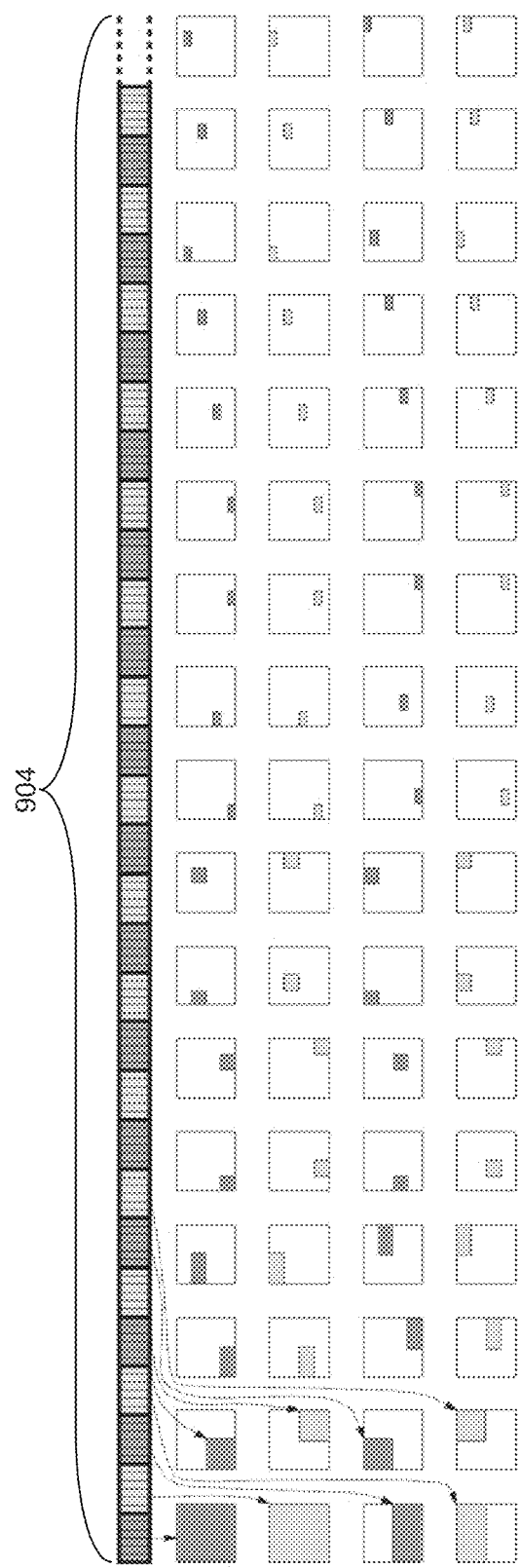
FIG. 10 depicts a data layout obtained for a two-dimensional matrix reorganized in hierarchical z-order in accordance with an example embodiment.
Figure 11C:
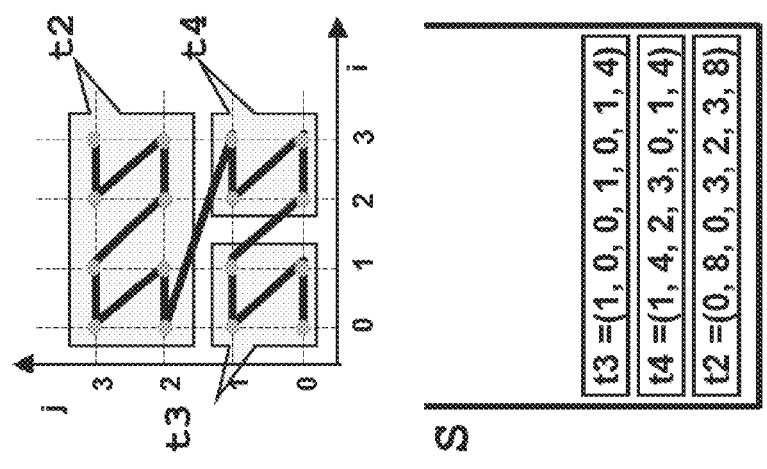
Figure 11D:
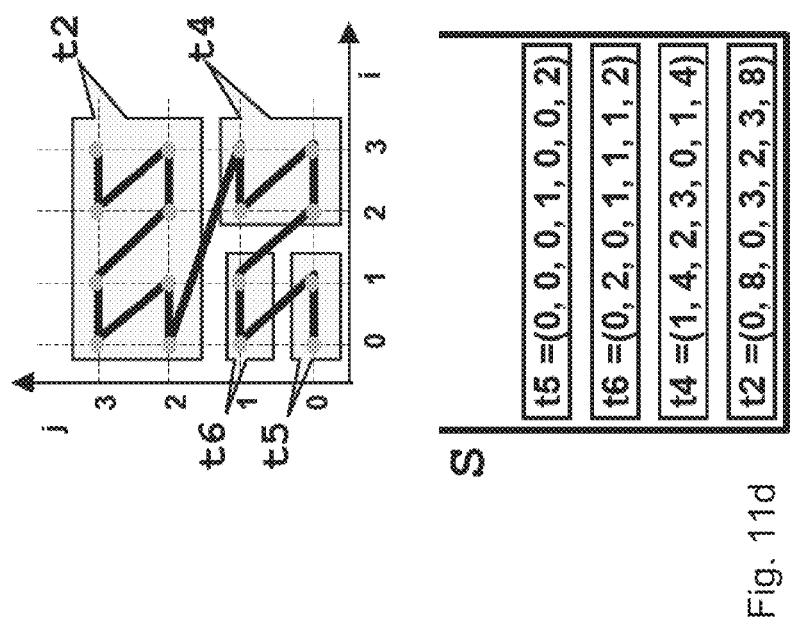
Figure 11E:
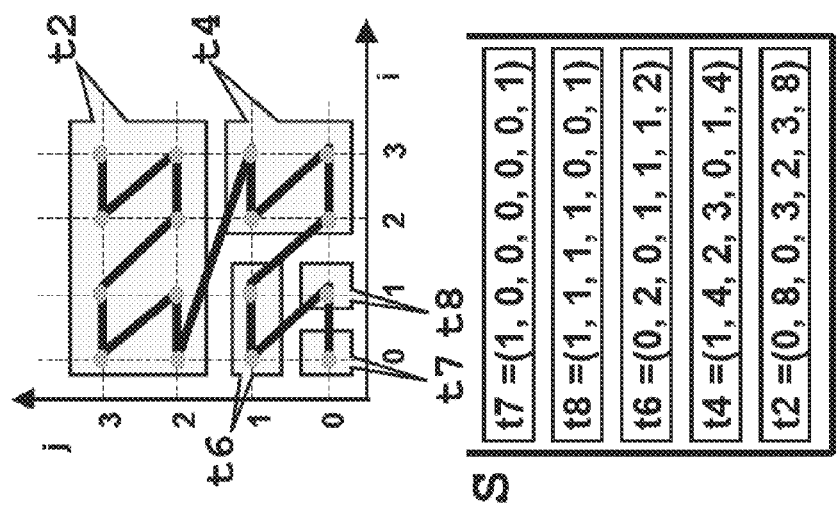
Figure 11G:
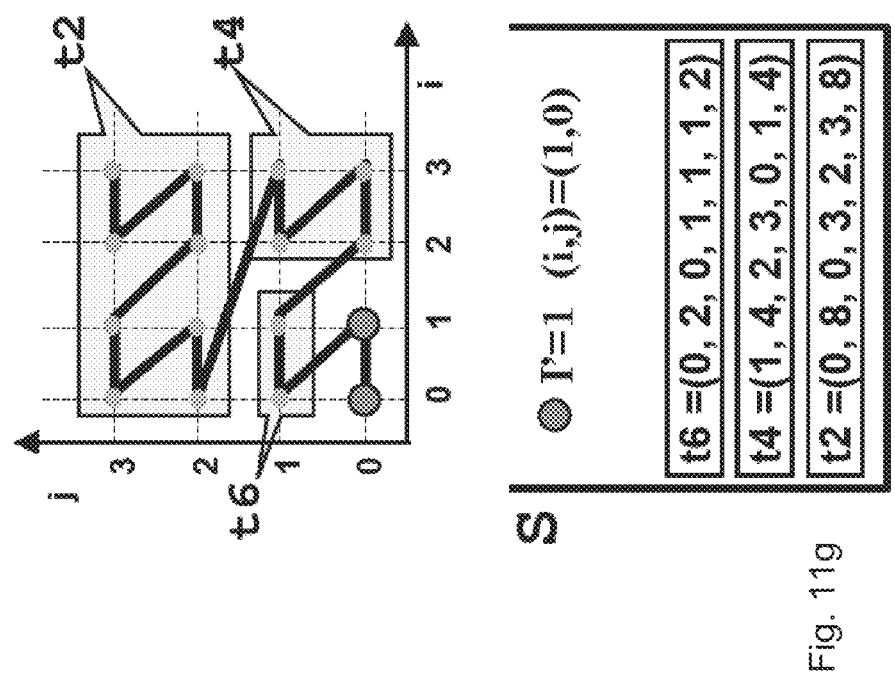
Figure 11H:
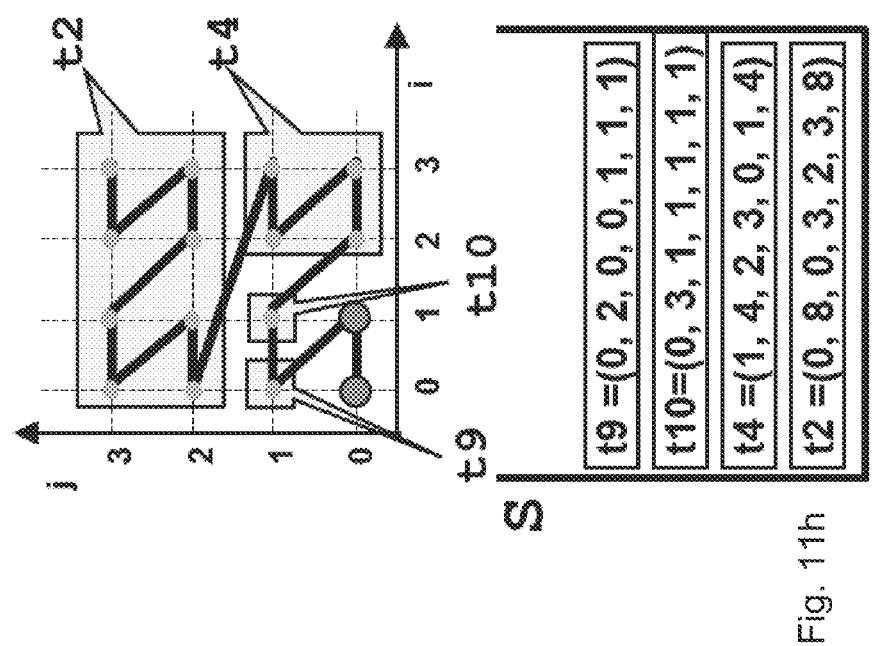
Figure 11I:
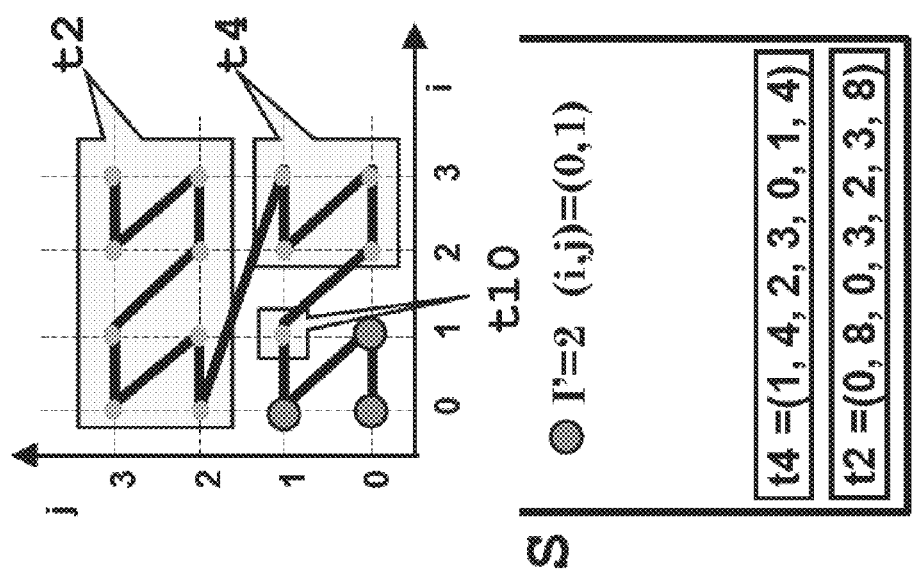
Figure 11J:
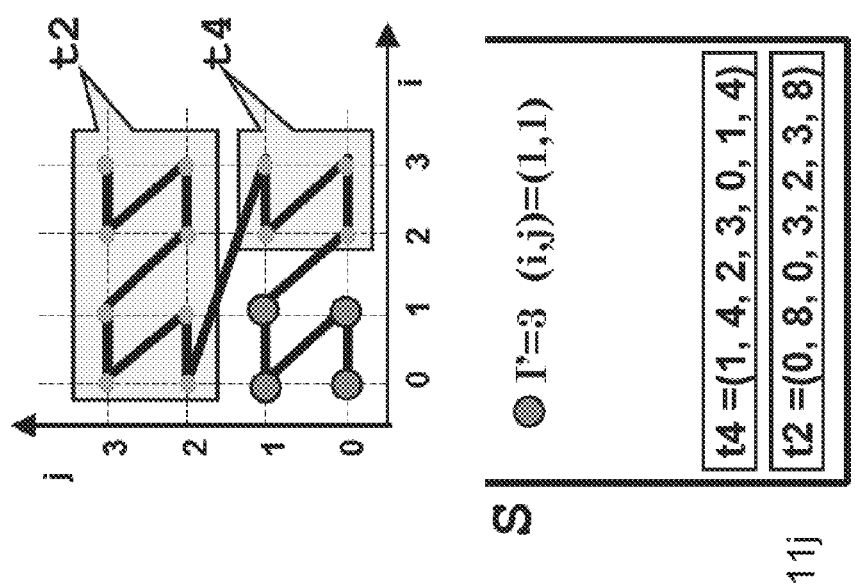

With reference to FIG. 10, a data layout of the data blocks 904 obtained for a two dimensional (2D) matrix reorganized using the hierarchical z-order index is shown. Each gray region shows where the block of data is distributed in the 2D array. In particular, the first block is the set of coarsest levels of the data distributed uniformly on the 2D array. The next block is the next level of resolution still covering the entire matrix. The next two levels are finer data covering each half of the array. The subsequent blocks represent finer resolution data distributed with increasing locality in the 2D array.

Figure 3:
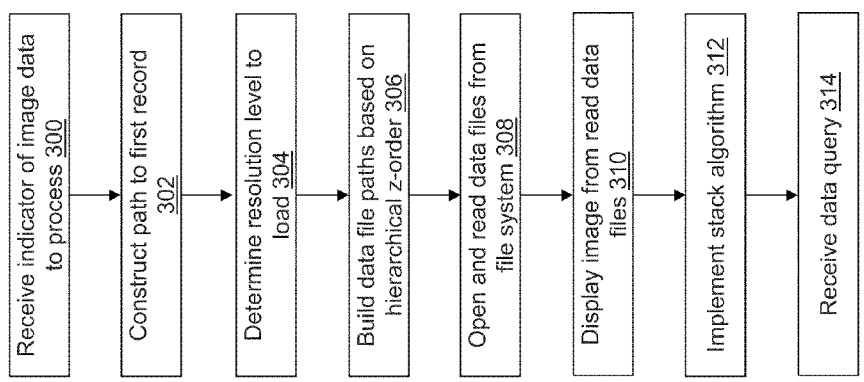
FIG. 3 depicts a second flow diagram illustrating second example operations performed by the data processing system of FIG. 1 in accordance with an example embodiment.

With reference to FIG. 3, second example operations associated with data processing application 114 of FIG. 1 are described. Additional, fewer, or different operations may be performed, depending on the embodiment. The order of presentation of the operations of FIG. 3 is not intended to be limiting. In an operation 300, an indicator of image data to process is received. For example, a user of data processing application 114 may select a data file to process using input interface 106. In general, the processing described with reference to FIG. 2 may have been performed previously so that the directory structure and hierarchical z-ordered data blocks have been created for the image data selected for processing. In an operation 302, a path is constructed to the first record of the indicated image data. For example, as discussed above, the path to the file is reconstructed by taking the hierarchical z-order address of the first sample in the record, representing the address as a string, and partitioning the string into groups of characters naming directories, subdirectories, and the record file.

In an operation 304, a resolution level to load is determined based on a function associated with the processing of the image data. For example, the resolution level may be set as a default based on a default zoom level of an image and a display resolution. In an operation 306, a data file path to each file is determined based on the selected resolution level and the hierarchical z-order. In an operation 308, the files are opened and read. In an operation 310, the image is displayed in display 104.

In an operation 312, a stack algorithm is implemented as part of the display of the image. A stack is an ordered list of items organized in a data structure based on the principle of last in first out. Items are removed from the list (stack) in a reverse order to the order of their addition. Any abstract data type can be an item or element of the stack. There are two main operations; push and pop. The "push" operation adds (stores) items to the list (stack). The "pop" operation removes (deletes) an item from the list (stack), and returns or exports a value for the item to the calling application.

With reference to FIGS. 11a-11j, a stack algorithm supporting fast index computation and data queries is described. The stack contains tuples or parameter lists including (split_dimension, I_start, min_i, max_i, min_j, max_j, num_elements). To start the process, with reference to FIG. 11a, the tuple $t_0=(1, 0, 0, 3, 0, 3, 16)$ is pushed onto the stack where in this example split_dimension=1, I_start=0, min_i=0, max_i=3, min_j=0, max_j=3, num_elements=16 as shown for the case illustrated in FIG. 4. At each iteration, the top-most element t is popped from the stack. If t contains only a single element, the current I_start is output as the hierarchical z-order index and the corresponding sample is fetched from the file structure. Otherwise, as shown with reference to FIG. 11b, the region represented by t is split into two pieces along the axis given by split_dimension, and the corresponding tuples are created such as $t_1=(0, 0, 0, 3, 0, 1, 8)$ and $t_2=(0, 8, 0, 3, 2, 3, 8)$. For example, the tuple parameter num_elements is divided by two because the region is divided in two and the tuple parameters min_i, max_i, min_j, and max_j are changed to indicate the appropriate boundaries for the two new regions. The elements of $t_1$ and $t_2$ can be computed from t by simple bit manipulation of each element of the tuple as shown in FIG. 12. In the case of a square array, the split dimension is flipped each time a tuple is split. However, a specific split order can also be stored to accommodate rectangular arrays. FIGS. 11c-11j show the first eight iterations of the stack algorithm outputting the first four elements in the array of FIG. 4.

To use this algorithm for fast range queries, each tuple is tested against a query box (or an arbitrarily shaped query region) as it comes off the stack and discarded if no overlap exists between the tuple and the query box. Since the row-major indices describing the bounding box of each tuple are computed concurrently (min_i, max_i, min_j, max_j), the intersection test is straightforward for a box. It is also simple to estimate conservatively for an arbitrary query region. Furthermore, the method applies virtually unchanged to traverse samples in z-order that sub-sample an array uniformly along each axis, where the sub-sampling rate along each axis could be different. Based on this, the array can be traversed in hierarchical z-order by processing one level at a time, adding $I_{start}^h$ to the I_start of each tuple.

In practice, the stack tuples may not be subdivided to the level of a single sample. Instead, depending on the platform, a parameter n may be selected and a table built with the sequence of z-order indices for an array with $2^n$ elements. When executing the stack algorithm, each time a tuple t with $2^n$ elements appears, the table is looped through instead of splitting t. By accessing only the necessary samples in strict hierarchical z-order, the stack-based algorithm guarantees that only the minimal number of disk blocks are touched and each block is loaded just once.

For progressively refined zooms in a given area, the algorithm can be applied with a minor variation. In particular, the size of the bounding box represented in a tuple can be reduced each time the tuple is pushed back onto the stack. In this way, even for a progressively refined zoom, only the needed data blocks are accessed, and the data blocks are only accessed once.

Figure 13:
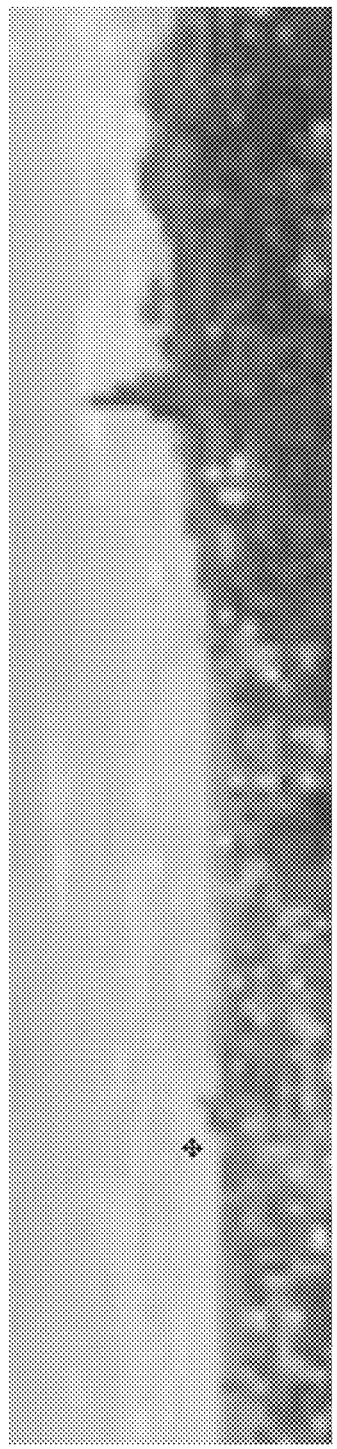
FIG. 13 depicts an image display at a first resolution level as a user pans the image in accordance with an example embodiment.
Figure 14:
FIG. 14 depicts the image display at a second resolution level higher than the first resolution level of FIG. 13 when the user stops panning the image in accordance with an example embodiment.

In an operation 314, a data query is received, for example, from a selection made by a user of data processing application 114 using input interface 106. As an example, the user may pan, zoom in, zoom out, or edit the displayed image. For example, in editing the image, the user may apply complex operators such as seamless cloning, panorama stitching, tone mapping, etc. The stack algorithm is used to provide a rapid response to the data query. The displayed resolution level may change dependent on the actions performed by the user in interacting with data processing application 114. For example, with reference to FIG. 12, a lower resolution level is displayed as the user pans the image. When the user stops panning, a higher resolution image shown with reference to FIG. 13, is displayed based on the rapidly accessible hierarchical z-ordered data and use of the stack algorithm. Using the described methods, data processing application 114 provides interactive editing of images that exceed hundreds of gigapixels in size.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more". The example embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
   a processor; and
   a non-transitory computer-readable medium operably coupled to the processor, the computer-readable medium having instructions stored thereon that, when executed by the processor, cause the system to
   order an array of image data in a hierarchical z-order in the computer-readable medium;
   create data blocks from the array ordered based on the hierarchical z-order;
   create data files containing a predetermined number of successive data blocks from the created data blocks;
   create a directory structure in a file system of a computing device based on the hierarchical z-order, wherein each directory level of the directory structure is named using a hierarchical z-order address represented as a string; and
   store the created data files in the created directory structure based on the hierarchical z-order.

2. A non-transitory computer-readable medium having stored thereon computer-readable instructions that, when executed by a computing device, cause the computing device to:
   order an array of image data in a hierarchical z-order in the computer-readable medium;
   create data blocks from the array ordered based on the hierarchical z-order;
   create data files containing a predetermined number of successive data blocks from the created data blocks;
   create a directory structure in a file system of a second computing device based on the hierarchical z-order, wherein each directory level of the directory structure is named using a hierarchical z-order address represented as a string; and
   store the created data files in the created directory structure based on the hierarchical z-order.

3. The computer-readable medium of claim 2, wherein the array of image data is a rectangular array.

4. The computer-readable medium of claim 2, wherein the array of image data is a square array.

5. The computer-readable medium of claim 2, wherein the computing device and the second computing device are the same computing device.

6. The computer-readable medium of claim 2, wherein the computer-readable instructions further cause the computing device to receive a block size indicator indicating a number of image samples included in each data block of the data blocks.

7. The computer-readable medium of claim 2, wherein the computer-readable instructions further cause the computing device to receive a group size indicator indicating a number of subdirectory levels to include in the created directory structure.

8. The computer-readable medium of claim 2, wherein the computer-readable instructions further cause the computing device to receive the predetermined number of successive data blocks indicating the number of created data blocks to include in each data file.

9. The computer-readable medium of claim 2, wherein the computer-readable instructions further cause the computing device to define header information including the predetermined number of successive data blocks and a compression flag indicating if the image data is compressed.

10. The computer-readable medium of claim 9, wherein the header information further includes a compression indicator indicating a type of compression if the compression flag indicates the image data is compressed.

11. The computer-readable medium of claim 9, wherein the header information is included in each created data file.

12. The computer-readable medium of claim 9, wherein the header information is included in a header file separate from the created data files.

13. The computer-readable medium of claim 9, wherein the header information further includes an interleaving sequence.

14. The computer-readable medium of claim 2, wherein the computer-readable instructions further cause the computing device to selectively display portions of the image data in a display of the computing device by building a path to a data file of the created data files using a hierarchical z-order index determined based on a resolution level selected for display of the image data.

15. The computer-readable medium of claim 14, wherein the computer-readable instructions further cause the computing device to concurrently determine a corresponding index into the array of image data.

16. The computer-readable medium of claim 15, wherein the computer-readable instructions further cause the computing device to store the determined corresponding index in a table.

17. The computer-readable medium of claim 2, wherein the created directory structure is distributed across a plurality of storage devices.

18. The computer-readable medium of claim 2, wherein the computer-readable instructions further cause the computing device to receive a request to present the image data at the computing device, push a plurality of parameter lists onto a stack of the computing device, wherein each parameter list is associated with a region in the image data and includes a hierarchical z-order index for the region, pop a parameter list of the plurality of parameters lists from the stack based on the received request, and access a stored data file of the stored data files using the hierarchical z-order index associated with the identified parameter list.

19. A method of providing an efficient data layout for image data, the method comprising:
   ordering an array of image data in a hierarchical z-order in a computer-readable medium of a computing device;
   creating data blocks from the array ordered based on the hierarchical z-order at the computing device;
   creating data files containing a predetermined number of successive data blocks from the created data blocks at the computing device;
   creating a directory structure in a file system of a second computing device based on the hierarchical z-order, wherein each directory level of the directory structure is named using a hierarchical z-order address represented as a string; and
   storing the created data files in the created directory structure based on the hierarchical z-order.

* * * * *